Nov. 30, 1926.

J. O. POLLACK 1,608,955

PRESS

Filed Feb. 24, 1925

Witnesses:
W. F. Kilroy
Harry R. Leiblett

Inventor:
Joseph O. Pollack
By
Attys

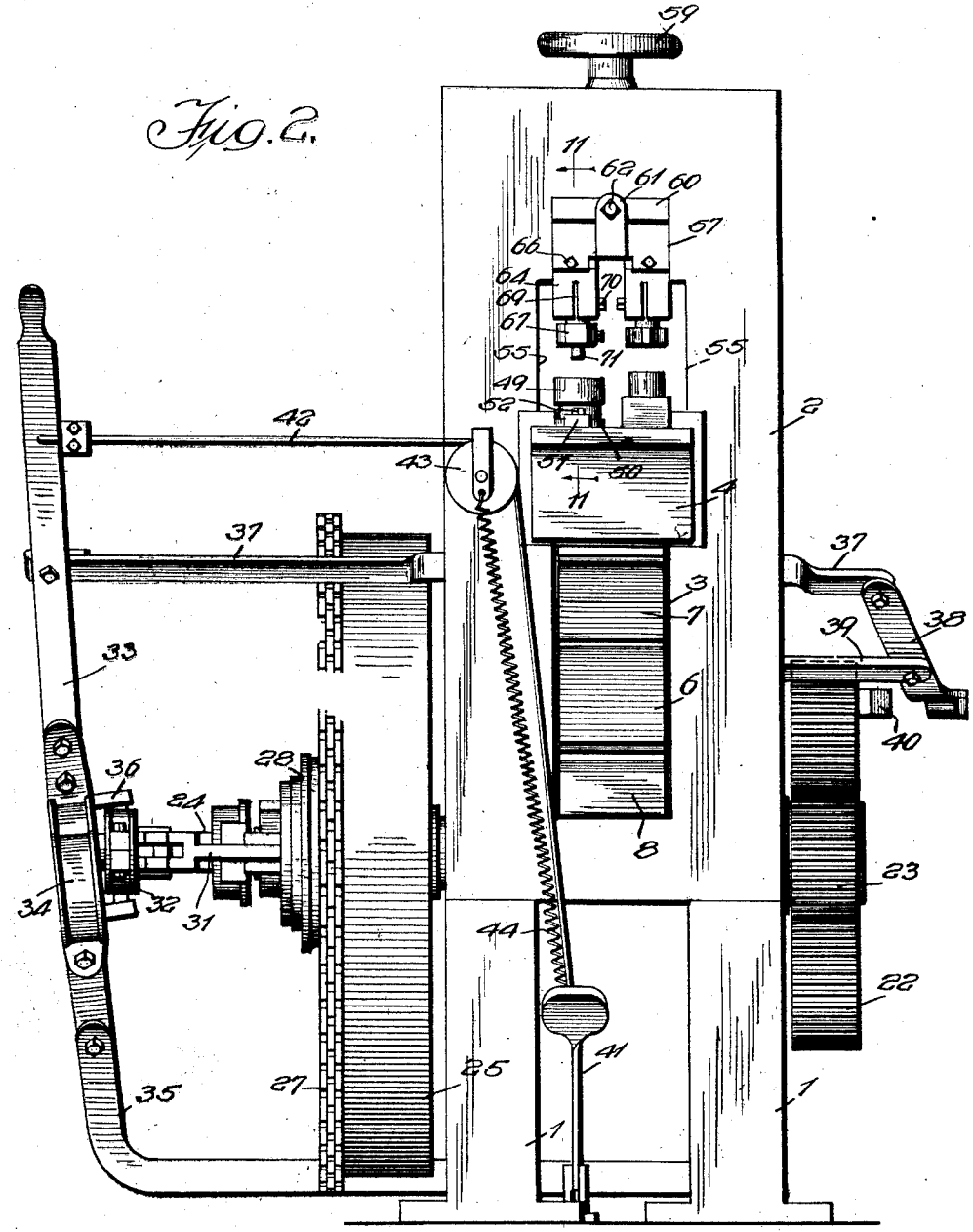

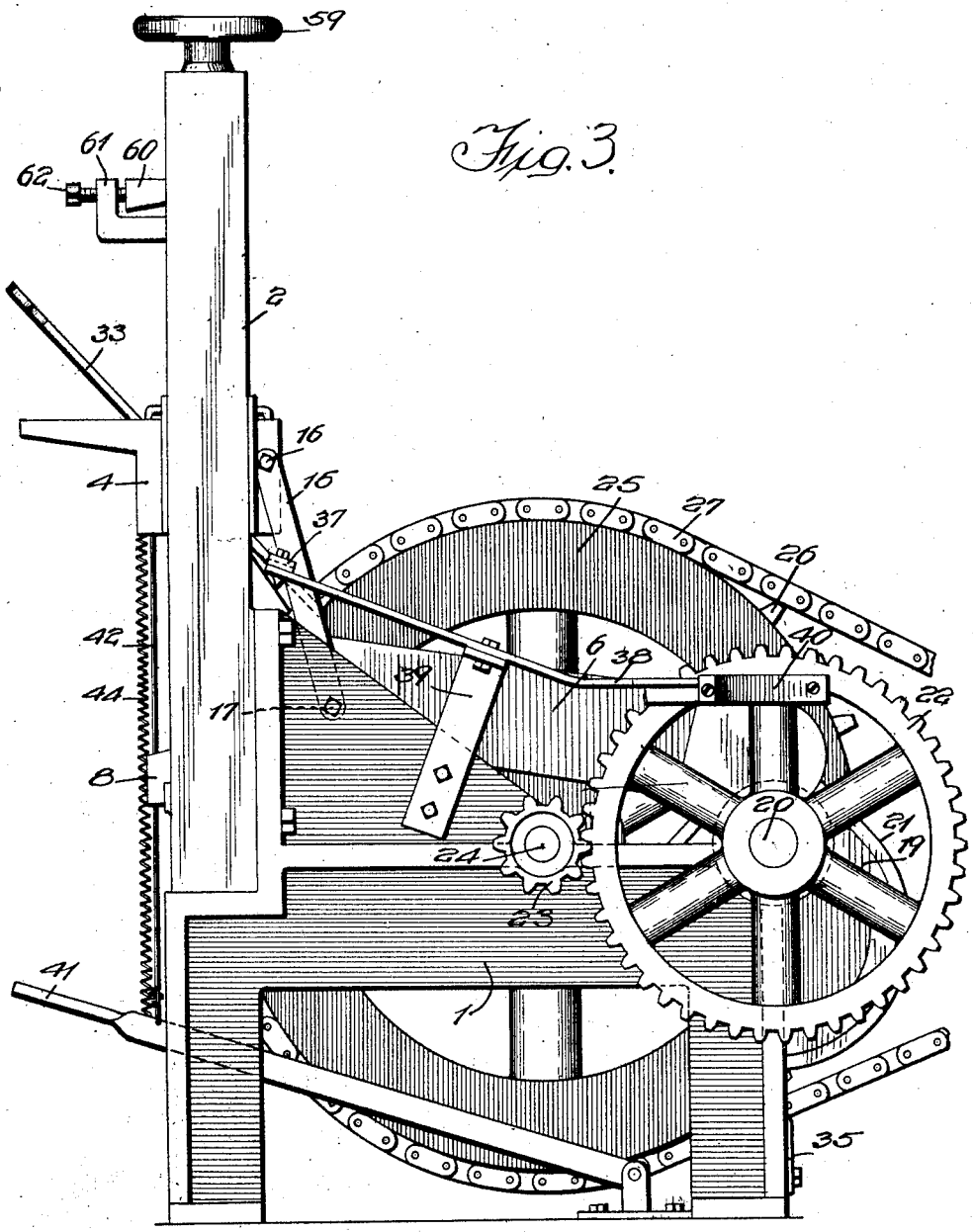

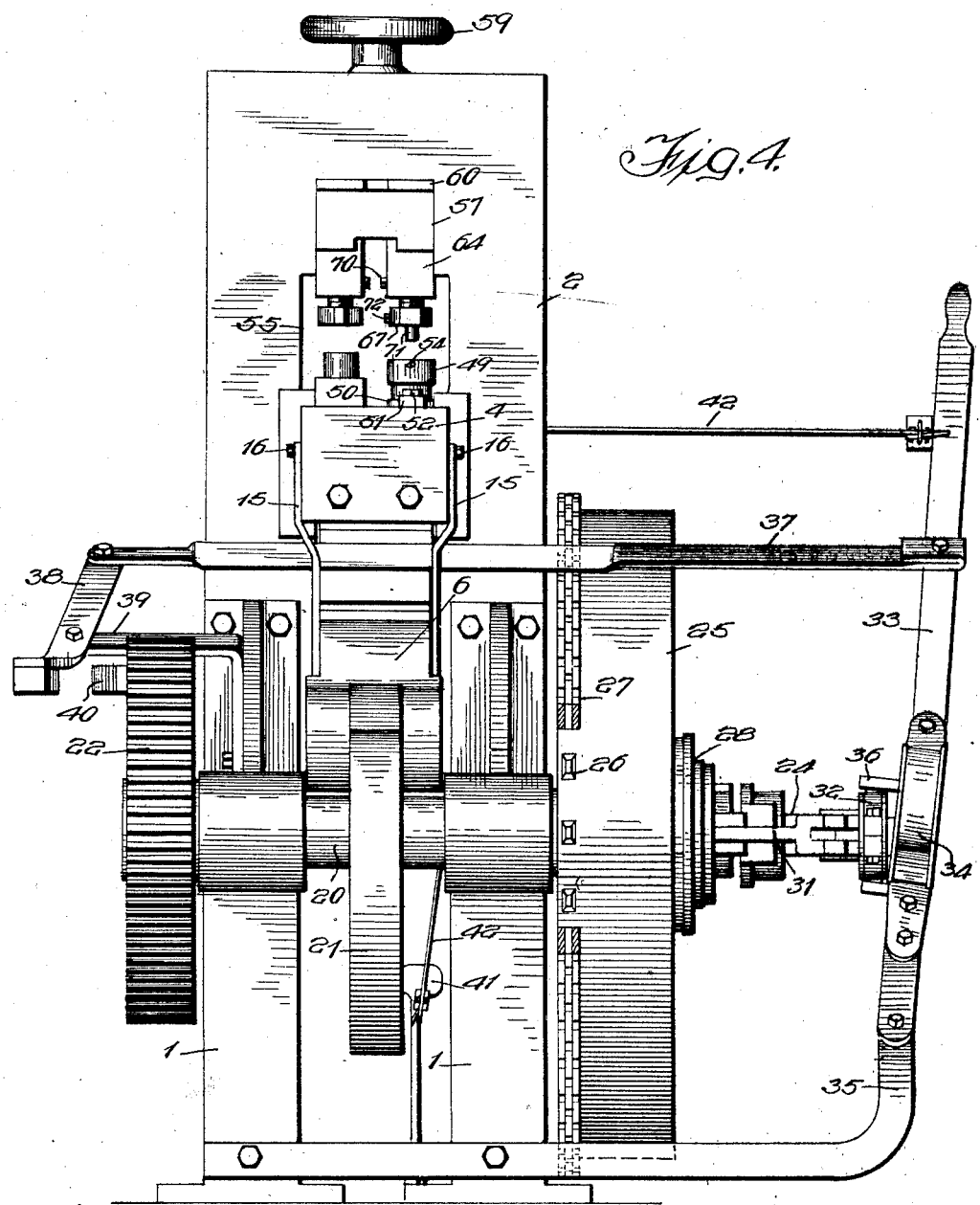

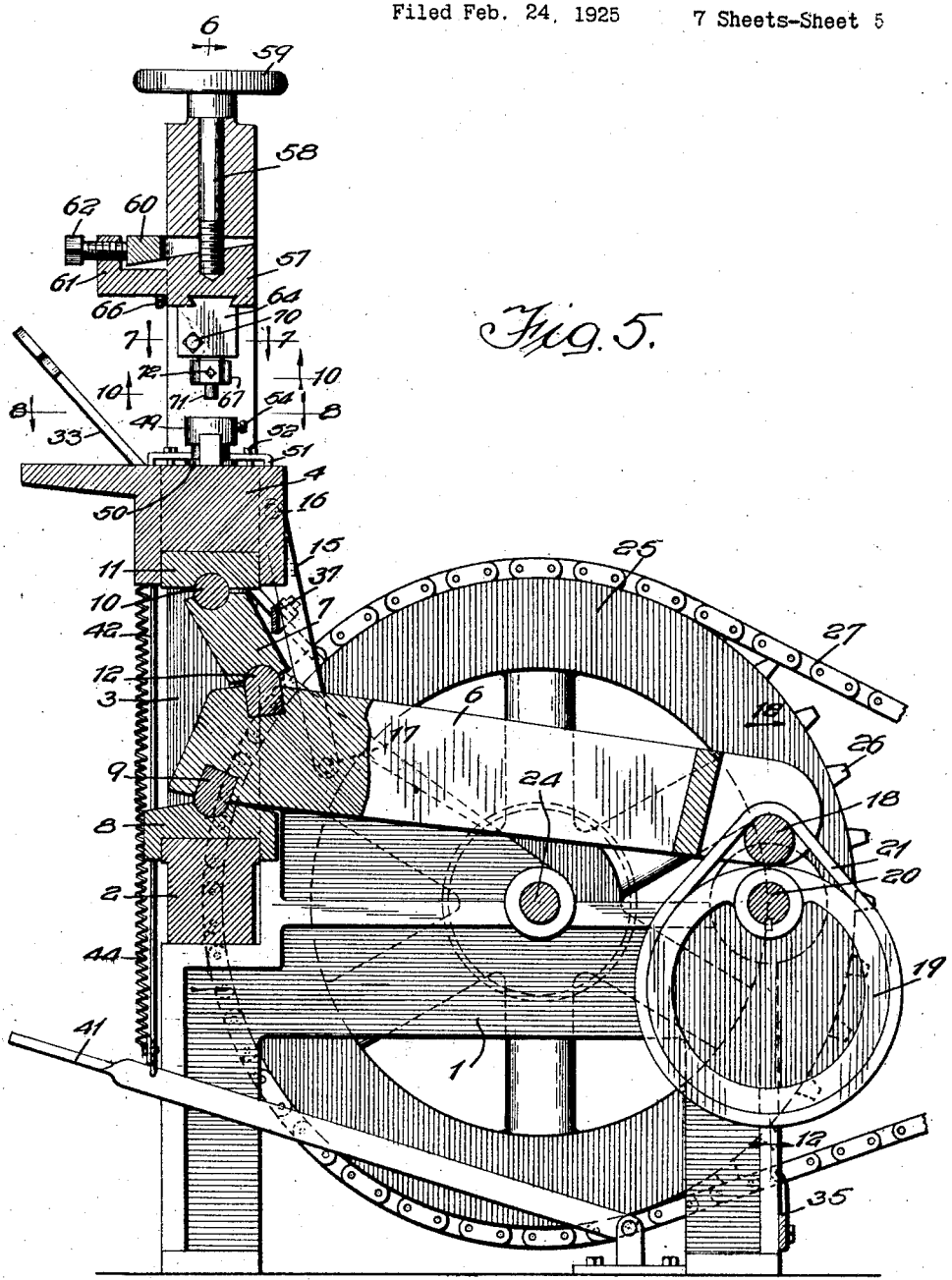

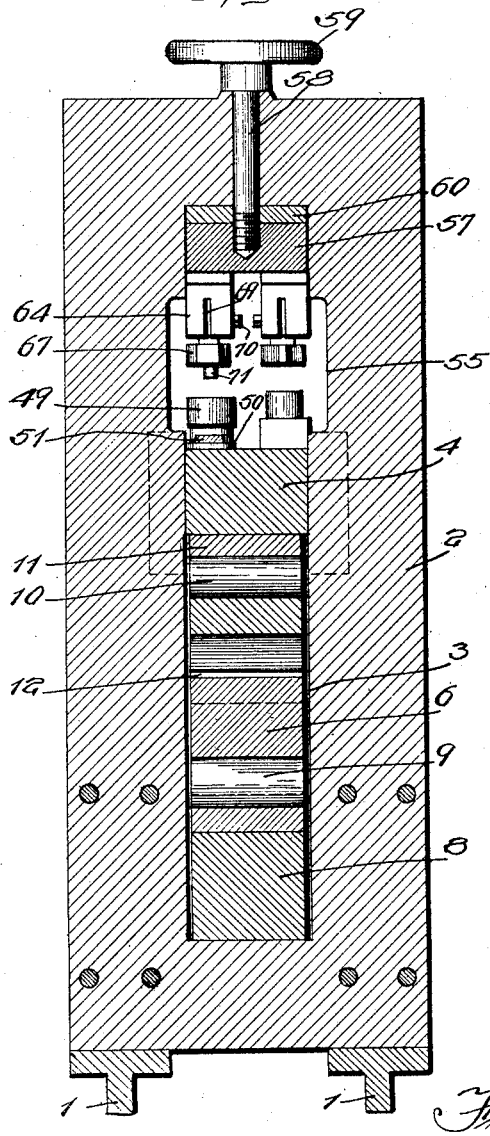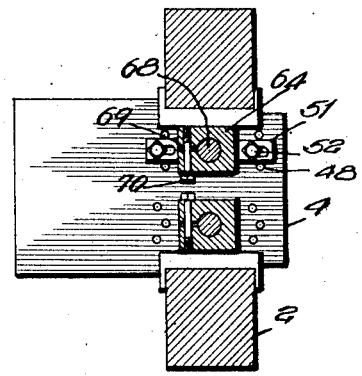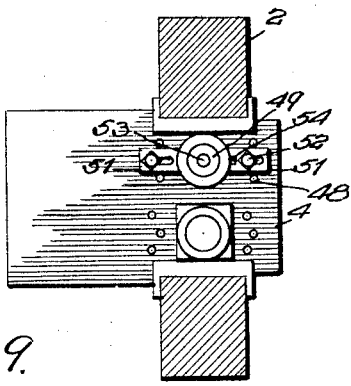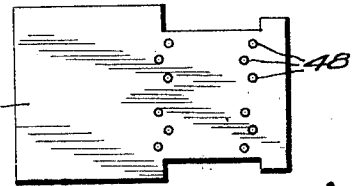

Nov. 30, 1926.

J. O. POLLACK

PRESS

Filed Feb. 24, 1925    7 Sheets-Sheet 7

1,608,955

Witnesses:
W. P. Kilroy
Harv. R. L. White

Inventor:
Joseph O. Pollack
By Hill & Hill
Attys.

Patented Nov. 30, 1926.

1,608,955

UNITED STATES PATENT OFFICE.

JOSEPH O. POLLACK, OF CHICAGO, ILLINOIS.

PRESS.

Application filed February 24, 1925. Serial No. 11,136.

My invention relates to improvements in presses, and more particularly to a press particularly adapted for light manufacturing but applicable for heavier manufacturing as well. The present invention is in the nature of an improvement over my pending application Serial No. 692,023, filed February 11th, 1924. The press is particularly designed for use in manufacturing jewelry and other small articles, and has among its objects the production of a device of the kind described that will be extremely smooth running and which will operate without excessive noise or vibration, whereby the same may be used in office buildings or the like where such machinery is generally not employed and is often prohibited. The same has among its further objects the production of a device of the kind described that is compact, simple, convenient, durable, efficient, powerful, and satisfactory for use wherever found applicable. Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 2 is a front elevation of the same;

Fig. 3 is a side elevation of the same;

Fig. 4 is a rear elevation of the same;

Fig. 5 is a sectional view taken substantially on line 5—5 of Fig. 1;

Fig. 6 is a sectional view taken substantially on line 6—6 of Fig. 5;

Fig. 7 is a sectional view taken substantially on line 7—7 of Fig. 5;

Fig. 8 is a sectional view taken substantially on line 8—8 of Fig. 5;

Fig. 9 is a top plan view of the movable head 4;

Figure 1:
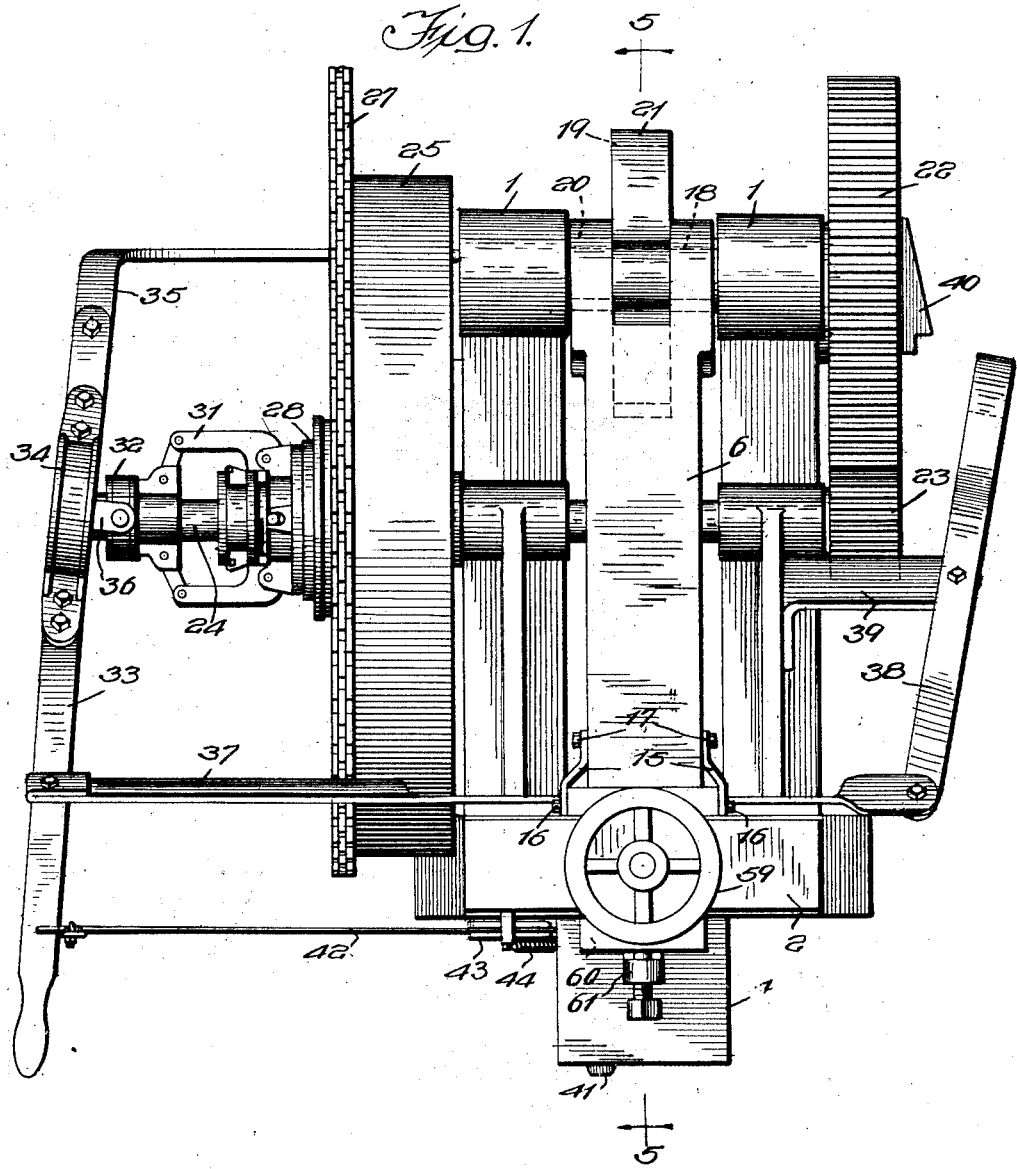
Fig. 1 is a top plan view of my improved press.
Figure 10:
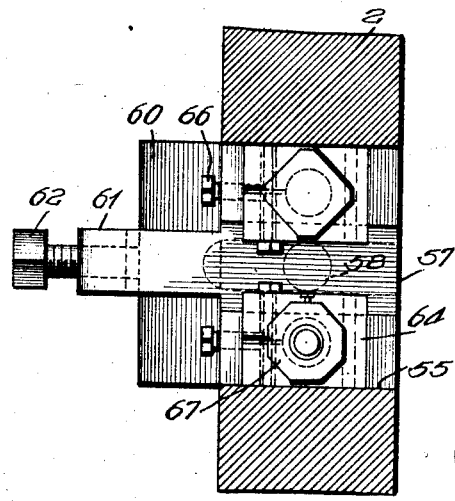
Fig. 10 is a sectional view taken substantially on line 10—10 of Fig. 5.

Referring to the drawings, in which only the preferred embodiment of my invention is shown, 1—1 represents a suitable base or legs which may be mounted upon a bench, table, floor, or other suitable place, and which carries the upright head frame 2 of suitable size, shape and material. The head frame 2 is provided with an opening, the sides 3 of which form guides for the movable head 4. The head 4 is arranged to engage at either side on the guides 3 and travel vertically in the head frame, as will be hereinafter described. As shown, the opening in the head frame is preferably enlarged at one end, as shown the upper end, as indicated at 55, so that the head 4 may be positioned on the guides.

The press is of the toggle type, the head being raised and lowered by means of the toggle levers 6 and 7. As shown, the toggle lever 6 rests upon a bearing member 8, the same being provided with a bearing block 9 preferably of hardened material. The member 7 is provided with a bearing member 10 which cooperates with the bearing members 11, both being preferably of hardened material. One of the toggle arms, as shown, arm 6, is provided with a bearing member 12 which engages with the arm 7. Obviously, as the outer or free end of the arm 6 is raised, the head 4 will be raised. I prefer to provide means for retrieving the head, and as shown, arms 15 connected to the head 4 and arm 6 at points 16 and 17 provide a positive connection which draws the head downwardly as the outer end of the arm 6 is lowered. The points of pivotal connection of the arms 15 are so arranged that the relative movements of the head 4 and the arm 6 are permitted. The outer end of arm 6 is preferably bifurcated and provided with a pin or roll 18 arranged to cooperate with the cam 19 mounted on shaft 20. The cam 19 and pin 18 or roll are maintained in engagement by a band or link 21 which allows their relative movements during the operation of the machine.

Shaft 20 may be driven in any suitable manner. In the construction shown, the shaft is extended to one side of the frame and carries a gear 22 arranged to mesh with the gear 23 on the driving shaft 24. It is preferred to arrange shaft 24 intermediate the ends of the arm 6 and shaft 20 adjacent the ends, so that the machine is compact and yet a long powerful toggle arm employed. A fly-wheel 25 is mounted on the shaft 24, and there is also provided a sprocket wheel 26 which may be in the form of teeth on the fly-wheel, this being driven by a sprocket chain 27 or equivalent means. Generally I prefer a positive drive such as a sprocket chain or its equivalent so that there will be no slipping between the source of power and shaft 24, as might be the case if a belt was employed for the purpose. The sprocket wheel and fly-wheel, however, are preferably connected to the shaft 24 through a clutch mechanism indicated at 28. the clutch itself not being shown in detail as any suitable clutch may be employed. In the machine illustrated, there is provided a hand control, as well as a foot and automatic control for the clutch. Referring particularly to Fig. 1, one of the clutch elements is connected by members 31 with the collar 32 on the shaft 24, and this is connected by means of a link 36 with a cooperating part 34 carried by the lever 33. Hand lever 33 is pivotally connected with the bracket 35 or its equivalent.

As shown, 37 is a link connected to a lever 38 carried by bracket 39 at the side of the machine, and which is arranged to cooperate with the cam member 40 (see Fig. 3). This provides an automatic control or stopping device, as will be hereinafter more fully explained. There is also provided a foot pedal control of any suitable type, that illustrated being a foot pedal 41 operatively connected by a cable 42 which extends from the foot pedal over a pulley 43 to the lever 33. A spring 44' may be provided for returning the foot pedal to its raised position.

The particular press or stamping machine shown is arranged to perform a plurality of stamping operations at each stroke, that is to say, provided with a plurality of dies or the like so that the output may be increased by the operator with a minimum of effort. The particular dies and work to be done may, of course, be varied, as for example, assuming that it is desired to blank out a piece, this may be done on one operation of the machine and then the blank transferred to the other die and the next operation take place, the operator removing the completed work, changing over the partially completed work to the completing die and inserting a new piece in the blanking die, so that the next operation in the machine the two operations referred to are accomplished. On the other hand, depending upon the work, two articles requiring but one operation may be stamped at the same time, regardless of whether they are similar or different, the arrangement being such that a very accurate and close setting of the dies is possible. I will only describe in detail one set of dies, to-wit, those for blanking out. it being understood that the others are as desired.

Referring to Fig. 9, the movable head 4 is provided with a face which I generally prefer to construct with bolt holes 48. The die block 49 shown is provided with a shouldered portion 50 either formed by grooving the die block or in some equivalent manner so as to permit the engagement with the block of the clamps 51 which are secured to the face of the head by bolts 52 or the equivalent. This particular block is shown with a cutting die member 53 which may be secured in place in the block by a bolt 54 or equivalent means. The frame 2 is provided with an adjustable head portion 57 which carries the cooperating dies, as will be described. The head 57 is shown supported by a bolt 58 which for convenience is provided with a hand wheel 59. There is also provided a wedge member 60 arranged to extend between the member 57 and the head of the frame so as to maintain the same in the proper and rigid adjustment without relying entirely on the bolt 58. In fact, all of the strain is taken through the wedge instead of on to the bolt. The wedge is shown as bifurcated so as to clear the bolt. As a means of adjusting the position of the wedge and maintaining it in operative position, I form 57 with an extending portion 61 and secure the desired adjustment by means of adjusting screw or bolt 62.

Figure 11:
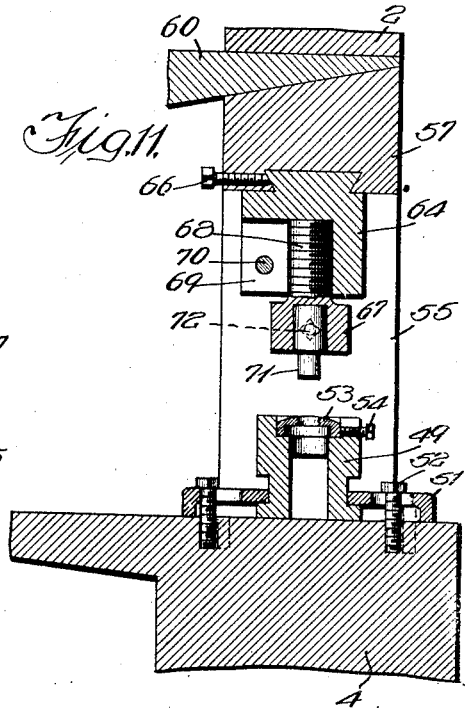
Fig. 11 is a sectional view taken substantially on line 11—11 of Fig. 2.
Figure 12:
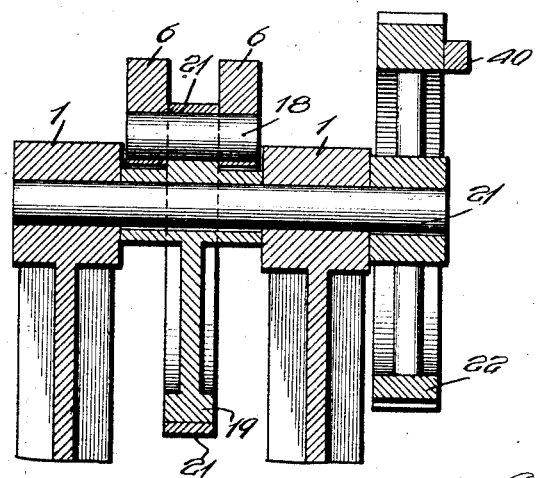
Fig. 12 is a sectional view taken substantially on line 12—12 of Fig. 5.

Carried by the adjustable head block 57 is the die block carrier 64 which is arranged to adjustably carry a die block carrying member or holder 67. As shown, 64 is adjustably secured to 57, same being arranged to interengage therewith by a dovetailed construction or the equivalent, and is locked in the desired adjustment by the set screw 66 or equivalent means. Member 67 is preferably provided with a threaded shank 68 arranged to engage with member 64 which is shown slotted as indicated at 69 and provided with a locking bolt or screw 70. The die 71 is shown removably secured in the holder 67 by a bolt or set screw 72. This construction permits a transverse adjustment of the member 64 in the adjustable head member 57, and also a vertical adjustment of the die part 71 independent of adjustment of member 57. When the parts are tightened down into the adjusted position, however, it should be noted that the die part 71 is substantially as rigidly connected with the frame 2 as if formed integral therewith. The opposite tools or dies, etc., shown in Figs. 4, 6, 11, etc., are constructed in a similar or equivalent manner.

The operation of the press may be briefly described as follows: Assuming that the parts are as shown in Fig. 5 with the movable head 4 in its lowered position, any stamping on the die block 49 may be removed and placed on the other die and a new piece inserted under the die 71 or vice versa. The hand lever or foot is then operated so as to throw the clutch into operation, whereupon shaft 24 is driven, and this transmits power to the shaft 20 through the gearing, thereby rotating the cam 19, and this cooperating with 18, raises the outer end of the toggle arm 6, thereby transmitting power through the toggle arm 7 to the movable head 4, causing the same to move upwardly in its guides. The dies or die parts carried by the head 4 are brought into operative relation with the cooperating parts carried by the adjustable head 57, and as the cam continues to rotate, it permits the toggle arm 6 to return to its position shown in Fig. 5, the band 21 positively pulling it down. Likewise in its downward movement, the toggle arm 6 acting through the links 15, draws the head 4 down. If the automatic stop or shut-off is provided, as for example the cam 40 and cooperating mechanism, when the parts reach the position shown in Fig. 5, the cam actuates link 38, the movement of which is transmitted through 37 to the hand lever 33, thereby controlling the clutch to stop the drive. The parts stop substantially as shown in Fig. 5. The operator may then remove, transpose, or replace the work under the dies, then throw the control lever and perform another operation. It is, of course, not necessary that two operations be performed at each operation of the machine as there may be some cases where only one die mechanism is used. However, it is possible for the operator to quickly and rapidly form a plurality of operations and work may be turned out much more rapidly than operating the machine each time for a single operation as some time is saved in stopping and starting.

The machine is especially quiet and noiseless, and operates with but little vibration. While, of course, the power depends upon the size of the machine, yet it is possible to construct a practically small compact machine with a very great deal of power. As before mentioned, the device is particularly adapted for use by jewelers and others doing light manufacture. For example, jewelry such as buttons, pins, and the like may be stamped out in great quantity at comparatively small expense. The nature of the work performed depends, of course, upon the particular die parts and the work to be accomplished, and hence I do not wish to be understood as limiting myself to any particular die operations.

It will be noted that the faces of the dies are always in view, thus permitting accurate placing of the work thereon and also permitting the operator to see that the die is always clean so that good impressions are secured. The dies are readily accessible, so that the danger of the operator being injured on the machine is comparatively remote, particularly with the same equipped with the automatic shut-off. The same being adjustable as described, it is very efficient where delicate or extremely accurate work must be done.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A toggle press comprising a movable die member, a relatively stationary die member, and toggle means for actuating said movable die member to and from said stationary member, including a toggle arm having a laterally extending end part, a cam operative to engage the free end of said end part, and means actuated by the cam during the return stroke of the movable die member for positively maintaining the said end part and cam in operative engagement.

2. A toggle press comprising a movable die carrying member, a stationary die carrying member, means for adjusting said stationary member relative the other, a cam and toggle means for lifting said movable member toward said stationary member, including means engaging the cam for positively retrieving the same.

3. In a press, a frame, a stationary die carrying member mounted in said frame and adjustable laterally thereof, a die carrying block, means for securing said block to said member whereby the block may be vertically adjusted, a movable die carrying member carried by the frame, means for adjustably securing a die block on said movable die carrying member, and means for moving the movable member toward and away from the stationary member.

4. In a press, a frame, a stationary die carrying member mounted in said frame and adjustable laterally thereof, a die carrying block, means for securing said block in a plurality of vertically adjusted positions on the member, a movable die carrying member, means for adjustably securing a die block on said movable die carrying member, means for moving the movable member toward and away from the stationary member, and means for automatically controlling the last-mentioned means after a predetermined cycle of operations.

5. In a press of the kind described and in combination, a frame provided with a normally fixed adjustable head and with a movable head and driving means therefor, said movable head movable toward or from the fixed head, a die carrier mounted on said fixed head between the fixed and movable head members consisting of a part adjustable transversely to the direction of travel of the movable head member, and a part adjustably connected therewith and adjustable toward or from the movable head member and having means for securing a die therein.

6. In a press of the kind described and in combination, a frame provided with a normally fixed adjustable head and with a movable head and driving means therefor, said movable head movable toward or from the fixed head, a die carrier mounted on said fixed head between the fixed and movable head members consisting of a part adjustable transversely to the direction of travel of the movable head member, and a part adjustably connected therewith and adjustable toward or from the movable head member and having means for securing a die therein, and means for securing said parts in fixed adjusted position.

7. In a press of the kind described and in combination, a frame provided with a stationary head member and a movable head member, die carrying means for mounting a die on one of the members, said means adjustable to permit adjustment of the die relative the other member, means for actuating the movable head member including toggle arms, one arm projecting laterally the frame, a drive shaft arranged below and intermediate the ends of said arm and extending transversely thereof, a cam shaft arranged parallel therewith adjacent the free end of said arm, intermediate driving means between said shafts, and a cam mounted on said cam shaft and operatively connected with said arm.

8. A toggle press comprising a movable die member, a relatively stationary die member, toggle means operatively connected to said movable die member, a cam for actuating said toggle means, and a band for maintaining the toggle means and cam in operative engagement.

In testimony whereof, I have hereunto signed my name.

JOSEPH O. POLLACK.